United States Patent [19]
Lear

[11] 3,861,624
[45] Jan. 21, 1975

[54] AIRCRAFT CABIN COMFORT CONTROL SYSTEM

[75] Inventor: William P. Lear, Verdi, Nev.

[73] Assignee: Lear Avia Corporation, Reno, Nev.

[22] Filed: Feb. 16, 1973

[21] Appl. No.: 333,146

[52] U.S. Cl. ........... 244/118 R, 62/DIG. 5, 236/91 E
[51] Int. Cl. ............................................ B64d 13/08
[58] Field of Search ............ 244/118 P, 118 R, 1 R; 236/91 E, 91 G, 78 C; 62/DIG. 5; 98/1.5

[56] References Cited
UNITED STATES PATENTS

| | | | |
|---|---|---|---|
| 2,466,779 | 4/1949 | Pevney | 244/118 P |
| 2,489,652 | 11/1949 | Lehane | 236/91 E |
| 2,519,109 | 8/1950 | Callender | 236/91 E |
| 2,553,262 | 5/1951 | Lehane et al. | 236/91 E |
| 2,556,065 | 6/1951 | Callender | 236/91 E |
| 2,572,293 | 10/1951 | Wilson et al. | 236/91 E |
| 2,583,524 | 1/1952 | Wissmiller et al. | 236/91 E |
| 2,617,598 | 11/1952 | Sanders | 236/91 E |
| 2,744,688 | 5/1956 | Ross | 236/91 E |
| 2,789,767 | 4/1957 | Martinson | 236/91 E |
| 3,711,044 | 1/1973 | Matulich | 244/118 P |

Primary Examiner—Trygve M. Blix
Assistant Examiner—Galen L. Barefoot
Attorney, Agent, or Firm—Richard A. Marsen

[57] ABSTRACT

An automatic temperature control system that maintains passenger comfort levels in aircraft when flying at high altitude. A fuselage skin sensor relays significant temperature changes of the ambient air about the plane to the system temperature controller. Heat transfer into the cabin is thereby smoothly compensated and controlled to predetermined level, during sustained operation in very cold environments. The amount of compensation is adjustable; its operation and control, close with comfortable results.

1 Claim, 2 Drawing Figures

3,861,624

AIRCRAFT CABIN COMFORT CONTROL SYSTEM

BACKGROUND AND SUMMARY OF THE INVENTION

An electrical heat sensor bridge is used to establish an automatic temperature control for heating and/or cooling the passenger cabin of the aircraft, as a jet plane. Resistive sensors, as thermistors are positioned in the cabin, and in the cabin-air duct as well. In the exemplary system hot bleed air is ducted to a heat exchanger. Cold ram air is controllably routed through the heat exchanger to determine its output air flow to the cabin. A ram air damper is adjustably operated by a damper control motor-actuator, and thereby determines the cabin air temperature.

The prior heat sensor bridge arrangements operated the damper motor to effect the temperature results, as preset. The results produced too hot or too cold cabin condition during usual jet plane flights. In accordance with the present invention a sensor of the outside ambient air temperature is provided, that anticipates cabin air control. This sensor is attached to the fuselage skin, and is connected directly into the heat sensor bridge circuit. The results have been found to provide unusually uniform temperature and comfort conditions in the control area, as the passenger cabin. Further, the anticipatory sensing of outside air conditions, that in turn effect the inside air content temperature needs, result in lower swings in the control actions.

DESCRIPTION OF THE INVENTION

Figure 2:
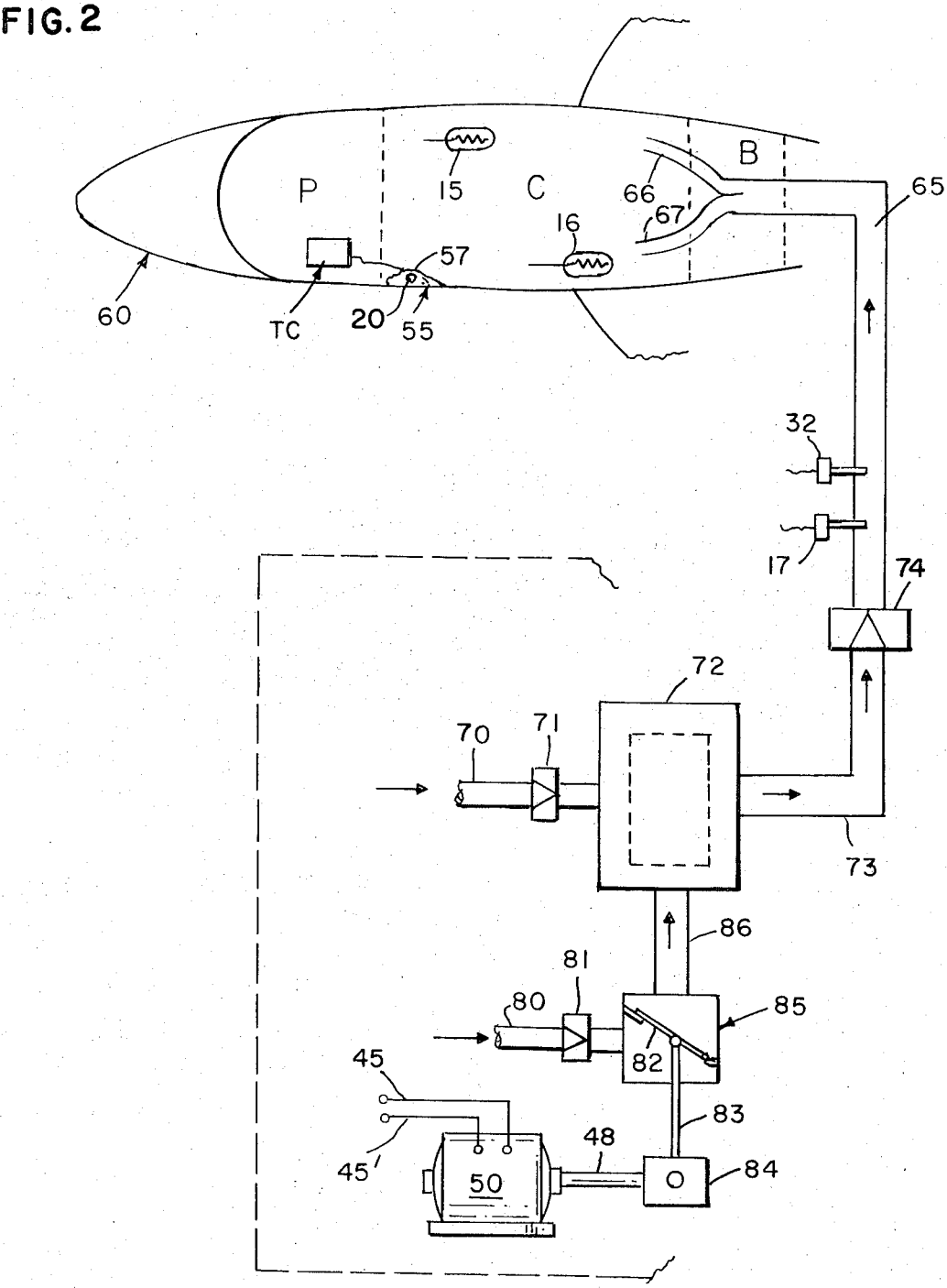
FIG. 2 is a system diagram of the exemplary heating control system for the aircraft.

The heat sensor bridge 10 contains resistive heat sensors 15, 16 and 17. These in practice are thermistors. Units 15 and 16 are suitably located in the passenger cabin C, as indicated in FIG. 2. Unit 17 is used to sense the temperature of the air entering the cabin, and projects into duct 65 for this purpose. Adjustable resistors 18 and 19 are used to balance sensor bridge 10 to a predetermined setting, in well known manner.

The bridge 10 is energized by a local battery voltage $+V_o$, as 28 volts, through ON Switch 11, and series resistor 12. The temperature controller unit 30 is similarly energized by switch 11 via lead 31, limit thermal switch 32, and lead 33. The thermal limit switch 32 may be located in input air duct 65, as indicated in FIG. 2.

In accordance with the present invention a thermal sensor 20 is positioned to determine and/or be affected by the ambient air temperature outside of the plane 60, particularly when in high altitude flight, in highly cold conditions. Exact measure of the cold air thereat is not required; reasonably qualitative indication has been found satisfactory for the purposes of the present invention. Towards this end, a thermistor 20 is secured at the inside of a section of the fuselage skin.

Figure 1:
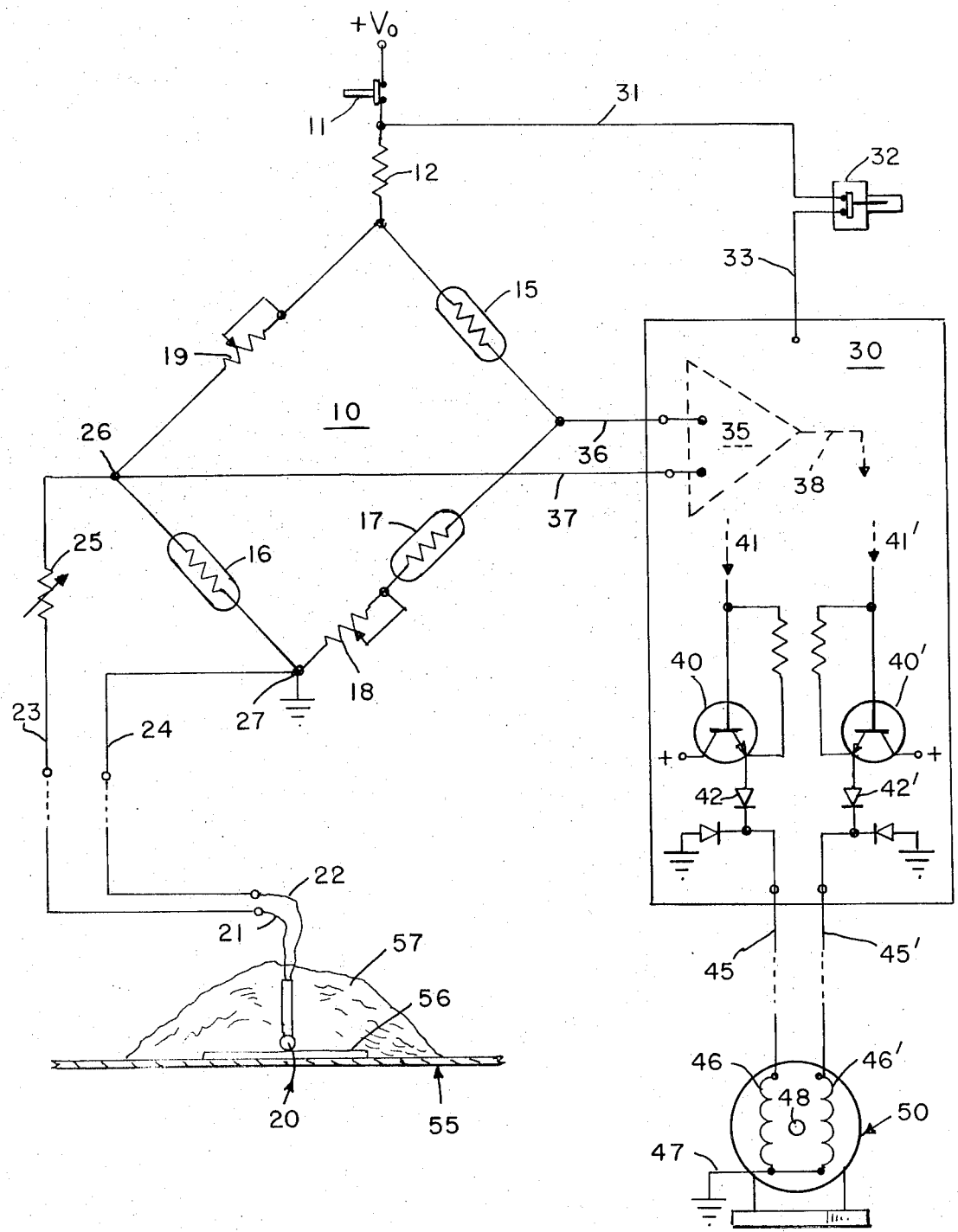
FIG. 1 is an electrical schematic diagram of the exemplary heat sensor bridge and associated temperature control circuitry.

One practical way to attach thermistor 20 to the skin section 55 of the fuselage is shown in FIG. 1. A nylon sheet 56, as 0.5 × 0.5 inches by 0.002 inches thick, is placed between thermistor 20 and the skin 55, on the plane interior. Structural cement 57 is used to bond this thermistor/sheet array to skin 55 as illustrated, with teflon-coated lead wires 21, 22 spliced to the thermistor pigtail. The bonded assembly 20, 56, 57 is then covered over with foam insulation (not shown). The exemplary sensor 20 was a Fenwal No. KB21J1 Thermistor; 180 ohm, ¼ watt size. Its location (55) is preferably near to the heat system controller unit (TC) that corresponds to bridge 10 with control circuit 30.

"Outside" sensor 20 is connected in parallel across one of the cabin sensors (16) via leads 23, 24 to points 26, 27 of bridge 10. An adjustable resistor 25 is in series with thermistor 20 to bridge 10. Its size and range are selected to provide the desired rate of compensation that skin sensor 20 has upon the overall system control on cabin heating. Resistor 25 is preset for the particular plane, and the heating performance preferred during cold altitude flight. As stated, better and smoother automatic cabin heating operation is made feasible than heretofore.

The output of bridge 10 is connected to temperature controller 30 via leads 36, 37. An operational amplifier is indicated at 35, as used in conventional electronic control circuitry, to convert off-balance bridge inputs (36,37) into control signals at 38. The related signal comparator circuitry for the control is now shown, to control output transistors 40, 40'. The input control signals 41, 41' thereto selectively energize the transistors, and in turn through protective diodes 42, 42' for operating the damper motor 50. The controller output leads 45, 45' extend to alternate windings 46, 46' of reversibly driven motor 50. The windings connect to ground potential at 47. The motor shaft 48 is thus operated through controller 30 in accordance with the status, presetting and unbalance of heat sensor 10 in conjunction with skin sensor 20, as will now be understood by those skilled in the art.

The exemplary heating/cooling system of the plane 60 is schematically shown in FIG. 2. Air ducts 65 leads the conditioned air into the passenger cabin section C via passages 66, 67. The pilot section is at P; the baggage compartment at B . . . for the executive jet airplane hereof. The basic air flow into duct 65 is derived from the hot bleed air routed from the engine region to pipe 70, and into heat exchanger 72 through check valve 71. The particular heat exchanger 72 is a two-pass, cross-counterflow, plate-fin type unit. The hot bleed air is routed through the core in cross-counterflow directions.

Concurrently, cold ram air is controllably routed over the core channels and overboard, resulting in substantial reduction of the bleed air temperature, and the desired conditioning of the air output from exchanger 72. This output air for cabin C is ducted along 73 to duct 65 through check valve 74.

The cold ram air enters pipe 80 and passes through control damper 85 via check valve 81. The rate of ram air flow in controlled by the degree of opening of the damper vane (or valve) 82, under the control of lever 83 from actuator 84. The actuator 84 is operable in either direction by the shaft 48 of damper motor 50 in the manner and purpose as hereinabove set forth.

What is claimed is:

1. An automatic control system for conditioning air ducted into the cabin section of a high altitude flying plane, comprising: a heat sensor bridge that includes first and second units located in the cabin section that are responsive to the temperature therein; a third sensor unit attached to a portion of the fuselage skin that is directly responsive to the temperature of the very cold air outside of the plane and is substantially insulated from cabin temperature; control means responsive to the electrical output of said sensor bridge and of said third sensor unit, said control means including a reversible motor-actuator operable in accordance with a preset temperature condition for the ducted air; and heat exchange means responsive to the operation of said motor-actuator to effect and substantially maintain the air at said preset temperature in the cabin section during flight; said third sensor unit being circuitally connected in said bridge in a manner to anticipate inside air control action for said motor-actuator in accordance with outside air temperature change, said heat exchange means including first ducting for engine hot bleed air, a cross-counterflow heat exchanger coupled with said first ducting, second ducting routing cold ram air into said heat exchanger, a damper in the second ducting for controlling the rate of ram air flow into the heat exchanger under control of said motor-actuator, and third ducting coupling the heat exchanger output as conditioned air to the cabin section.

* * * * *